US010423855B2

(12) United States Patent
Cameron et al.

(10) Patent No.: US 10,423,855 B2
(45) Date of Patent: Sep. 24, 2019

(54) COLOR RECOGNITION THROUGH LEARNED COLOR CLUSTERS

(71) Applicant: HEWLETT PACKARD ENTERPRISE DEVELOPMENT LP, Houston, TX (US)

(72) Inventors: Pashmina Cameron, Cambridge (GB); Timothy Woods, Cambridge (GB)

(73) Assignee: ENTIT SOFTWARE LLC, Sunnyvale, CA (US)

(*) Notice: Subject to any disclaimer, the term of this patent is extended or adjusted under 35 U.S.C. 154(b) by 133 days.

(21) Appl. No.: 15/454,913

(22) Filed: Mar. 9, 2017

(65) Prior Publication Data
US 2018/0260974 A1 Sep. 13, 2018

(51) Int. Cl.
G06K 9/46 (2006.01)
G06K 9/62 (2006.01)

(52) U.S. Cl.
CPC ......... G06K 9/4652 (2013.01); G06K 9/6221 (2013.01); G06K 2209/23 (2013.01)

(58) Field of Classification Search
CPC ............ G06T 7/90; G06T 2207/30252; G06K 9/4652; G06K 9/6269
USPC ........................................................ 382/159
See application file for complete search history.

(56) References Cited

U.S. PATENT DOCUMENTS 6,021,196 A * 2/2000 Sandford, II ......... G06T 1/0028
380/213
7,308,418 B2 * 12/2007 Malek .................... G06Q 30/02
705/7.32
9,633,483 B1 * 4/2017 Xu ........................... G06T 17/10
2007/0058858 A1 * 3/2007 Harville et al. ......... G06K 9/00
382/165
2007/0282666 A1 * 12/2007 Afeyan .................... G06F 17/50
706/13

(Continued)

FOREIGN PATENT DOCUMENTS

CN 101334835 12/2008
CN 101436252 5/2009

(Continued)

OTHER PUBLICATIONS

Chen, et al; Vehicle Color Recognition on Urban Road by Feature Context; IEEE Transactions on Intelligent Transportation Systems; 2014 IEEE; 7 pages.

(Continued)

Primary Examiner — Jonathan S Lee

(57) ABSTRACT

In some examples, a system includes a color cluster learning engine and a color recognition engine. The color cluster learning engine may be configured to obtain a set of training images, process the training images to obtain clusters of pixel colors for the training images, identify learned color clusters from the clusters of pixel colors obtained from the training images, and label the learned color clusters with color indicators. The color recognition engine may be configured to receive an input image for color identification, process the input image to obtain a particular cluster of pixel colors that covers the highest number of pixels in the input image, match the particular cluster to a particular learned color cluster labeled with a particular color indicator, and identify a color of the input image as specified by the particular color indicator.

20 Claims, 8 Drawing Sheets

(56) References Cited

U.S. PATENT DOCUMENTS

| | | | | |
|---|---|---|---|---|
| 2011/0002018 A1* | 1/2011 | Tsunematsu | ....... | H04N 1/40062 |
| | | | | 358/530 |
| 2013/0083999 A1* | 4/2013 | Bhardwaj et al. | ....... | G06K 9/46 |
| | | | | 382/165 |
| 2014/0245115 A1* | 8/2014 | Zhang | .................... | G06F 17/24 |
| | | | | 715/202 |

FOREIGN PATENT DOCUMENTS

| CN | 102184413 | 9/2011 |
|---|---|---|
| CN | 102737221 | 10/2012 |
| CN | 103440503 | 12/2013 |
| CN | 103996041 | 8/2014 |

OTHER PUBLICATIONS

Hsieh, J-W. et al., "Vehicle Color Classification Under Different Lighting Conditions Through Color Correction", (Research Paper), Sep. 19, 2016, 26 pages.

Rachmadi, et al; Vehicle Color Recognition using Convolutional Neural Network; Multimedia and Network Engineering Department; Institut Teknologi Sepuluh Nopember, Keputih Sukolilo, Surabaya Indonesia; Oct. 26, 2015; 5 pages.

Wang, Y-C. et al., Vehicle Color Classification Using Manifold Learning Methods From Urban Surveillance Videos, EURASIP Journal on image and Video Processing, Springer Open, Oct. 16, 2014, 25 pages.

* cited by examiner

COLOR RECOGNITION THROUGH LEARNED COLOR CLUSTERS

BACKGROUND

With rapid advances in technology, computing systems are increasingly prevalent in society today. Vast computing systems execute and support applications that communicate and process immense amounts of data. Computing systems can be used to analyze video streams or image sets.

BRIEF DESCRIPTION OF THE DRAWINGS

Certain examples are described in the following detailed description and in reference to the drawings.

DETAILED DESCRIPTION

Examples consistent with the present disclosure may support color recognition through learned color clusters. As described in greater detail herein, color clusters may be learned from provided training images and subsequently used to recognize colors in other input images. In some examples, determination of color clusters from training or input images may include the use of a weighted distance metric, which may selectively adjust components of a color space in distance computations. Such distance computations between two values represented in a color space may referred to as color distance computations (and may include computations involving non-color components of a color space). For pixels represented in a color space including a luminance component, the weighted distance metric may effectively reduce the effects of illumination variation and support increased accuracy and color differentiation. Other features described herein may include biasing clustering processes towards learned color clusters, which may aid in image classification and color recognition. These and other features are described in greater detail herein. The various color cluster learning and color recognition features described herein may increase the accuracy and efficiency of image systems.

Figure 1:
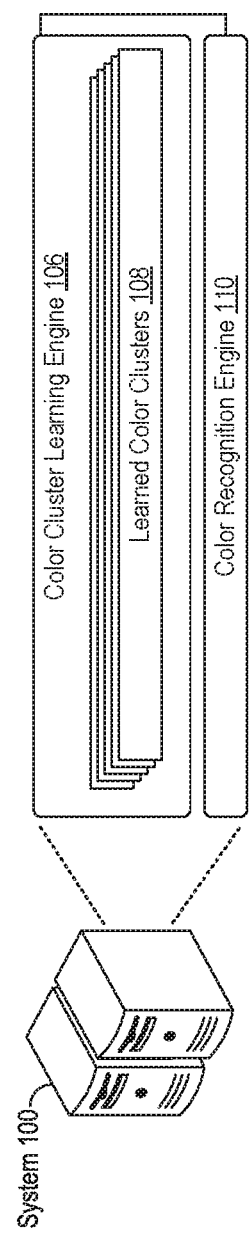
FIG. 1 shows an example of a system that supports color recognition through learned color clusters.

FIG. 1 shows an example of a system 100 that supports color recognition through learned color clusters. The system 100 may take the form of any computing system that includes a single or multiple computing devices such as servers, compute nodes, desktop or laptop computers, smart phones or other mobile devices, tablet devices, embedded controllers, and more.

The system 100 may include various elements to provide or support any of the color cluster learning and color recognition features described herein. In the example shown in FIG. 1, the system 100 includes a color cluster learning engine 106 that may identify a set of learned color clusters 108 from a set of training images as well as a color recognition engine 110 that may perform color recognition on input images using the learned color clusters 108.

The system 100 may implement the engines 106 and 110 (including components thereof) in various ways, for example as hardware and programming. The programming for the engines 106 and 110 may take the form of processor-executable instructions stored on a non-transitory machine-readable storage medium, and the processor-executable instructions may, upon execution, cause hardware to perform any of the features described herein. In that regard, various programming instructions of the engines 106 and 110 may implement engine components to support or provide the features described herein.

The hardware for the engines 106 and 110 may include a processing resource to execute programming instructions. A processing resource may include various number of processors with a single or multiple processing cores, and a processing resource may be implemented through a single-processor or multi-processor architecture. In some examples, the system 100 implements multiple engines (or other components) using the same system features or hardware components, such as a common processing resource, a common machine-readable storage medium, etc.

In some examples, the color cluster learning engine 106 may be configured to obtain a set of training images, process the training images to obtain clusters of pixel colors for the training images, identify the learned color clusters 108 from the clusters of pixel colors obtained from the training images, and label the learned color clusters 108 with color indicators. Color indicators may refer to any identifying mark, and may take the form of common color names, color codes, any type of visual indicators, and the like. The color recognition engine 110 may be configured to, for example, receive an input image for color recognition, process the input image to obtain a particular cluster of pixel colors that covers the highest number of pixels in the input image, match the particular cluster to a particular learned color cluster labeled with a particular color indicator, and identify a color of the input image as specified by the particular color indicator.

These and other example aspects of the color cluster learning and color recognition features disclosed herein are described in greater detail next. Some of the following examples and discussion refer specifically to vehicle color recognition features. However, any combination of the features described herein may be consistently applied to color cluster learning and color recognition for other image sets, including images of other object types or combination of object types.

Figure 2:
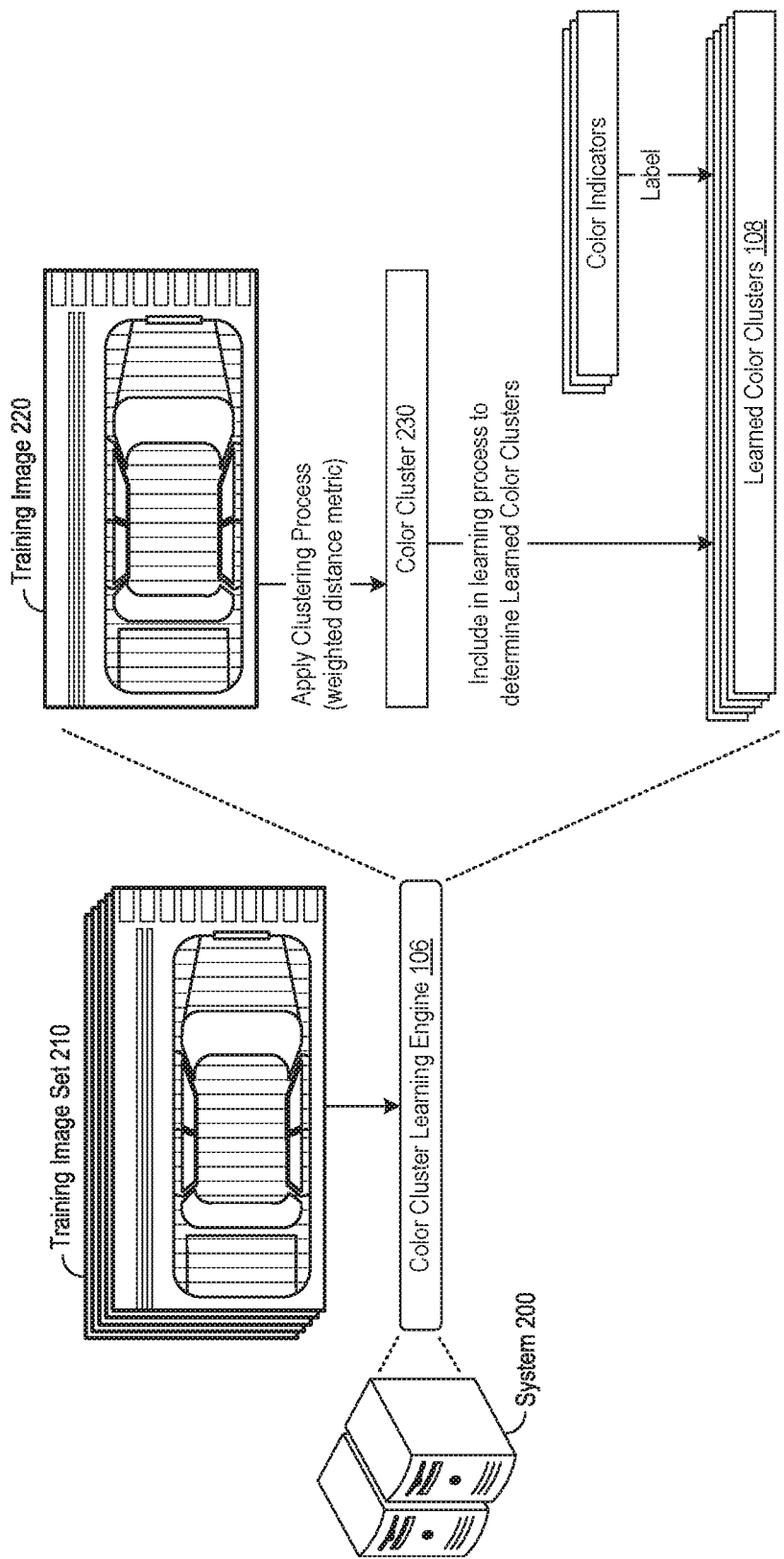
FIG. 2 shows an example of a system that includes a color cluster learning engine to learn color clusters from a set of training images.

FIG. 2 shows an example of a system 200 that includes a color cluster learning engine 106 to learn color clusters from a set of training images. The color cluster learning engine 106 may access a set of training images from any number of sources, such as video feeds, image databases, user input, and various other sources. Training images accessed by the color cluster learning engine 106 may provide an image base from which the color cluster learning engine 106 extracts color clusters. As such, training image sets may comprise images of specific image types (e.g., vehicle images, facial images, interior design images, news article images, and many more).

In the example shown in FIG. 2, the color cluster learning engine 106 accesses a training image set 210 that includes vehicle images. The training image set 210 may be extracted through image analysis, for example by an automatic license plate recognition system that captures vehicle images responsive to license plate detections in images. In that regard, a license plate recognition may capture images of a different portions of vehicles at varying angles, viewpoints, and scale based on a position of a detected license plate (e.g., from recorded or live video input). As another example, a motion detection system may be triggered to capture images of vehicles, which the color cluster learning engine 106 may use as the training image set 210. As yet another example, the training image set 210 may include static vehicle images captured by a user or digital camera.

Training images processed by the color cluster learning engine 106 may include varying image characteristics to increase a range of color clusters learned from the training images. Using vehicle images as an illustrative example, the training image set 210 may include vehicle images with different vehicle colors as well as a varying range of illumination levels (e.g., vehicle images captured in bright or dim sunlight, in shadows, indoors, outdoors, in cloudy conditions, in the rain, and more). As the number depicted vehicle colors and the vehicle illumination variance in the training image set 210 increases, the color cluster learning engine 106 may identify learned color clusters for vehicles with greater range and accuracy. For other image types, the color cluster learning engine 106 may access sets of training images that vary in illumination or various other characteristics.

The color cluster learning engine 106 may process the training image set 210 to identify learned color clusters. In doing so, the color cluster learning engine 106 may learn specific color clusters that emerge strongly from the training image set 210. These learned color clusters may correlate to, for example, common vehicle colors and may be used for subsequent vehicle color recognition.

In processing the training image set 210, the color cluster learning engine 106 may process individual training images. To illustrate through FIG. 2, the color cluster learning engine 106 accesses an individual training image 220 and clusters pixels of the training image 220 into clusters of pixel colors (also referred to as color clusters). Clusters may be represented through a color center, which the color cluster learning engine 106 may specify as a color value in a color space. In clustering image pixels of the training image 220, the color cluster learning engine 106 may apply any number or combination of clustering processes, such as K-means or any other clustering processes.

In applying the clustering process, the color cluster learning engine 106 may initialize a set of random cluster centers. The color cluster learning engine 106 may then assign pixels of the training image 220 into different clusters according to computed color distances, recalculate cluster centers, and apply cluster removal criteria. Color distances between the color values of pixels in the training image 220 and cluster centers may be computed as part of the clustering process. Once the clustering process converges or at any other configurable process halting criteria, the color cluster learning engine 106 may obtain clusters of pixel colors extracted from the training image 220.

In some implementations, the color cluster learning engine 106 uses a weighted distance metric in clustering pixels of the training image 220. The weighted distance metric may weight specific components of a color space differently, and thus color distance computations in the color space may be subsequently adjusted according to the parameters of the weighted distance metric. The color cluster learning engine 106 may use the weighted distance metric to selectively adjust component values of a color space in distance calculations or any other calculation. The weighted distance metric may adjust values of color space components in various ways, on a per-component basis, for specific component ranges, and the like. The weighting mechanism applied by the weighted distance metric may be specified through weight curves for different components, and specific weight values along the weight curve may be normalized to between 0 and 1 to indicate the particular weight of a component value.

To illustrate through a specific example, training images in the training image set 210 (including the training image 220) may be represented in a color space including a luminance component, such as the CIELab color space or various other perceptual color spaces. The color cluster learning engine 106 may process training image 220 using a weighted distance metric that selectively adjusts a weight of the luminance component of a pixel color at ends of a luminance spectrum (e.g., very light or very dark luminance). When computing the distance between a particular pixel in the training image 220 and cluster centers, luminance component values of the particular pixel and the cluster centers may be reduced in accordance with the weight curve as part of color distance computations. As such, the distance between the luminance component values of the particular pixel and cluster centers may be reduced as compared to other components of the color space.

Such a weighted distance metric may, in effect, reduce the contribution of a luminance component in color distance calculations and increase the contribution of non-luminance (e.g., color) components in computing color distances. In some examples, use of such a weighted distance metric may increase the level of color distinction discernable in darkened vehicle images (e.g. with low luminance component values) as well as bright vehicle images (e.g., with high luminance component values). For instance, navy and black vehicle colors may be difficult to distinguish in low-illumination conditions. Reduction of the luminance component through the weighted distance metric may increase the level of distinction between navy and black vehicle colors in such low-light conditions, and may thus support identification of distinct color clusters for navy and black. In that regard, use of the weight distance metric may allow a system to reduce or negate the effects of local and global illumination variance and increase color recognition accuracy.

Various implementations of the weighted distance metric are possible. In some implementations, the weighted distance metric may weight the luminance component of a pixel color with a first weight value at the ends of the luminance spectrum and a second weight value at a midpoint of the luminance spectrum. To reduce luminance contributions at spectrum ends, the second weight value applied by the color cluster learning engine 106 may be greater than the first weight value. Using weight values normalized between 0 to 1 as an example, the weighted distance metric may specify a weight value of 1.0 at the luminance spectrum midpoint (e.g., a luminance component value of 50 in a luminance spectrum with values between 0 and 100) and specify a weight value of 0.0 at the luminance spectrum ends (e.g., luminance component values of 0 and 100).

In some examples, the weighted distance metric may weight the luminance component values linearly between the ends of the luminance spectrum and the midpoint of the luminance spectrum. In regards to the example above with normalized weight values of 1.0 at the midpoint and 0.0 at spectrum ends, such a linear distribution may result in a weight value of 0.5 at luminance component values of 25 and 75, a weight value of 0.25 at luminance component values 12.5 and 87.5, and so on. Linear weight curves may increase efficiency in application of the weighted distance metric, as linear computations may be performed with high speed and lesser resource consumption in computing color distances.

In other examples, the weighted distance metric may weight luminance component values between the ends of the luminance spectrum and the midpoint of the luminance spectrum according to an entropy curve, with the luminance component value corresponding to a probability value for the entropy curve. A weighted distance curve correlated to an entropy curve may result in increased accuracy in differentiating between colors at varying luminance, and may thus be used to learn, differentiate, or recognize colors with increased accuracy, in particular at luminance spectrum ends.

As yet another example regarding the weighted distance metric, the color cluster learning engine 106 may use a configurable "alpha" weight, also referred herein as 'α'. In such examples, the weighted distance metric may apply weight value of 'α' at a spectrum midpoint of a particular color space component and apply a weight value '1−α' at spectrum endpoints. The weight curves in such examples may be linear, align with an entropy curve, or be otherwise configured according to any other weight value distribution.

While many of the examples above relate to selectively reducing the value of a particular color space component (e.g., luminance component values in the CIElab or other perceptual color space), the color cluster learning engine 106 may additionally or alternatively apply weighted distance metrics that selectively increase values of particular component values. As such, the weighted distance metric may impact color distance calculations computed in clustering processes applied to training images.

Through use of the weighted distance metric, the color cluster learning engine 106 may obtain clusters of pixel colors that account for illumination variance and support color recognition and differentiation amongst various illumination levels. Such a feature may be particularly useful for vehicle frames and bodies with metallic colors or intermingled sparkling particles that affect color recognition at extreme illuminations (e.g., very bright or very dark lighting conditions). Use of the weight distance metric may allow a system to identify color differences in such lighting conditions, for example by reducing or negating the effects of local and global illumination variance.

By applying a clustering process with a weighted distance metric, the color cluster learning engine may process the training image 220 to extract one or more color clusters from the training image 220. In the example in FIG. 2, the color cluster learning engine 106 obtains the color cluster 230 from the training image 220, which may be the particular color cluster output from the clustering process that includes the greatest number of assigned pixels of the training image 220. In some examples, the color cluster learning engine 106 extracts multiple color clusters from the training image 220, e.g., the top 'N' number of largest extracted clusters (e.g., largest as measured according to number of assigned image pixels), the largest-sized clusters that together occupy more than a threshold percentage or size of the training image 220, or according to any other configurable criteria. In a consistent manner, the color cluster learning engine 106 may apply a clustering process with a weighted distance metric to extract color clusters from other training images of the image training set 210 as well.

After or concurrent with extracting color clusters from individual training images, the color cluster learning engine 106 may apply a learning process to determine a set of learned color clusters from the training image set 210. For example, the color cluster learning engine 106 may further group or process the color clusters extracted from individual training images to form a dictionary of learned color clusters that strongly emerge from training image set 210. The further grouping or processing may include a different application of a clustering process to group the specific colors and colors extracted from the training images, e.g., through K-means or any other clustering process, including usage of a weighted distance metric. In that regard, the color cluster learning engine 106 may apply a subsequent clustering process (e.g., K-means using a weighted distance metric) upon cluster centers extracted from individual training images to determine the learned color clusters 108.

As an output of the learning process, the color cluster learning engine 106 may identify or obtain the learned color clusters 108 for the training image set 210, which may also be referred to a set of dictionary clusters. For an training image set 210 comprised of vehicle images, the learned color cluster 108 may include specific pixel colors, cluster centers, or any other cluster representation that represent the various vehicle colors learned from the training image set 210. In some examples, the learned color cluster 108 may include vehicle colors at different illumination levels as the clustering and/or learning process may differentiate between vehicles of the same color, but at different illuminations. As examples, the learned color clusters 108 may include a bright red color cluster for red vehicles at higher illumination component levels (e.g., in sunny or bright lighting conditions) as well as a dark red color cluster for red vehicles at lower illumination component levels (e.g., in nighttime, rainy, or other dark lighting conditions). Various other vehicle colors may be represented in the learned color clusters 108 as well.

In some implementations, the color cluster learning engine 106 may merge pixel data of the image training set 210 and apply a clustering process upon pixel data of the image training set 210 as a whole. Instead of processing individual training images and applying a subsequent learning process to extracted cluster centers, the color cluster learning engine 106 may process the image training set 210 as a whole. To do so, the color cluster learning engine 106 may perform a clustering process (e.g., K-means using a weighted distance metric) upon the merged pixel data of the image training set 210. The color clusters output by the clustering process may be identified by the color cluster learning engine 106 as the learned color clusters 108.

The color cluster learning engine 106 may apply labels to the learned color clusters 108. In particular, the color cluster learning engine 106 may label the learned color clusters 108 with color indicators, such as common color names in English or other languages, or according to any other indicators that identify colors represented in the learned color clusters 108. In some examples, the color cluster learning engine 106 may label multiple learned color clusters with the same color indicator. Referring again to an example above, the learned color clusters 108 may apply a "red" color indicator to a bright red color cluster as well as a dark red color cluster included in the learned color clusters 108. Thus, a color cluster learning engine 106 may identify learned color clusters 108 from a set of training images 210.

Figure 3:
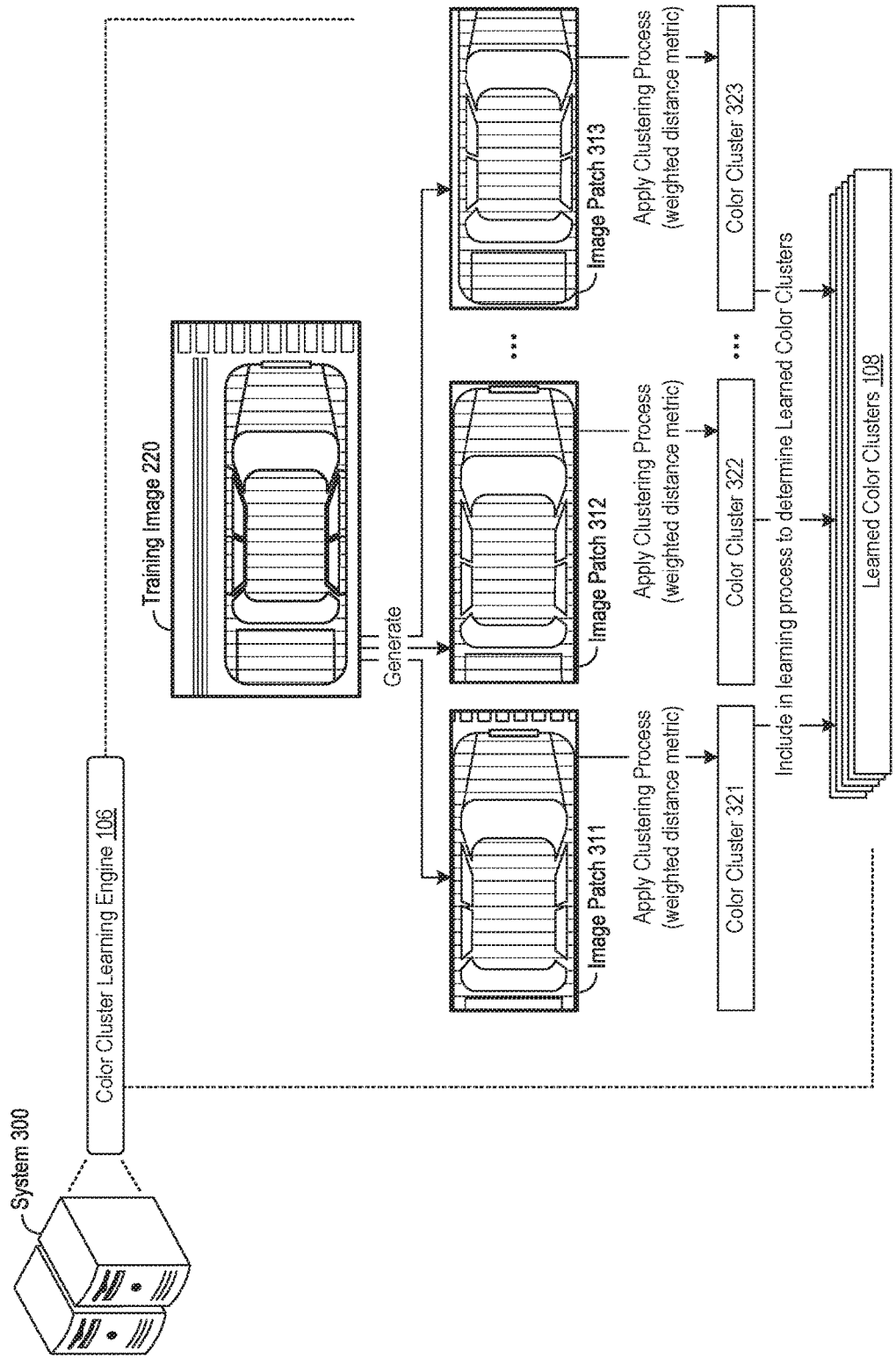
FIG. 3 shows an example of a system that includes a color cluster learning engine to generate multiple image patches in order to color clusters from a set of training images.

FIG. 3 shows an example of a system 300 that includes a color cluster learning engine 106 to generate multiple image patches in order to learn color clusters from a set of training images. An image patch may refer to a selected sub-image cropped, extracted, or otherwise taken from an image according to patch extraction criteria. In FIG. 3, the color cluster learning engine 106 generates the image patches 311, 312, and 313 from the training image 220.

The color cluster learning engine 106 may generate image patches for any number training images in response to various patch generation criteria. Patch generation criteria may be satisfied, for example, when training images depict extraneous content. For vehicle images, the color cluster learning engine 106 may generate image patches for a particular training image (e.g., the training image 220) when the particular training image includes portions of multiple vehicles, includes the road or other background in more than a threshold portion of the training image, or in other ways. Detection of multiple vehicles may be accomplished by identifying multiple groups of image colors associated with vehicles or multiple license plate detections in image analysis. Detection of road portions or background portions may be performed through pre-learned colors associated with the road or common background elements. While some patch generation criteria examples are provided specifically for vehicle training images, other criteria may be specified for training image sets of other types. Thus, the color cluster learning engine 106 may selectively identify training images to generate image patches from.

In some examples, the color cluster learning engine 106 may generate multiple image patches from each individual training image that satisfies the patch generation criteria. The number of patches generated for each individual training image may be configurable, and may vary based on the degree to which the training images satisfy the patch generation criteria. For example, the color cluster learning engine 106 may generate a greater number of image patches for a vehicle image that depicts a road for more than a first threshold image percentage and a lesser number of image patches for another vehicle image that depicts a road for more than a second image threshold percentage less than the first threshold image percentage. Other implementations are possible.

To generate the image patches, the color cluster learning engine 106 may extract selected portions of the training image to reduce extraneous content. For the training image 220 shown in FIG. 3, the color cluster learning engine 106 may generate image patches that include the vehicle body while excluding other portions of the training image (e.g., the road, other vehicles, and the like). In effect, the color cluster learning engine 106 may oversample the training image at various overlapping points in order to reduce extraneous non-vehicle content. For example, the color cluster learning engine 106 may identify a vehicle body from the training image 220, which may be accomplished through a predetermined image offset from an identified license plate, through detection of a vehicle body portion through identification of a contiguous color segment of the vehicle image across the vehicle chassis, or in various other ways. From the identified vehicle body, the color cluster learning engine 106 may extract image patches, and each extracted image patch may vary in offset from other extracted image patches to oversample the training image 220.

As an illustration depicted through FIG. 3, the color cluster learning engine 106 extracts the image patches 311, 312, and 313 from the training image 220. The extracted image patches 311, 312, and 313 are each offset from another, and thus include overlapping image portions as well as differing image portions. In some implementations, the color cluster learning engine 106 may maintain an overlapping ratio amongst generated image patches, e.g., such that each image patch generated from a particular training image includes at least 50% overlap (or any other configurable overlap threshold) with other image patches generated from the particular training image.

To process generated image patches, the color cluster learning engine 106 may apply a clustering process using a weighted distance metric to the image patches 311, 312, and 313 generated from the training image 220. Doing so may result in color clusters extracted from each individual image patch, such as the color clusters 321, 322, and 323 shown in FIG. 3. In some examples, the color cluster learning engine 106 includes each of the color clusters 321, 322, and 323 in a learning process to determine a set of learned color clusters (along with other color clusters extracted from other training images).

As another example, the color cluster learning engine 106 may determine a representative color cluster from the color clusters 321, 322, and 323, whether by selecting a color cluster extracted from an individual image or by further processing the extracted color clusters. Examples of further processing include averaging or otherwise merging the color clusters 321, 322, and 323 or performing consensus analysis among the color clusters 321, 322, and 323 (e.g., via random sample consensus, various voting mechanisms, and the like). Thus, the color cluster learning engine 106 may obtain a representative color cluster determined from generated image patches, and may thus determine a particular color cluster from the training image 220 to include in a subsequent process to generate the learned color clusters 108.

In some examples, the color cluster learning engine 106 may generate image patches from individual training images, and include pixel data from the generated image patches as part of processing the image training set 210 as a whole (e.g., as opposed to processing individual training images or individual image patches). In such cases, the color cluster learning engine 106 may merge image pixel data of individual training images and generated image patches to process as a whole, e.g., as described above. The color clusters extracted from the merged image data may provide the learned color clusters 108, and may account for pixel data from the generated image patches.

The examples described with respect to FIG. 3 may provide mechanisms by which the color cluster learning engine 106 may oversample a training image 220 through image patch generation. The oversampled image patches may provide for variations in color cluster extraction, and the inclusion of varying extracted color clusters or a consensus color cluster from the oversampled training image 220 may increase the effectiveness of color cluster learning and subsequent color recognition.

Figure 4:
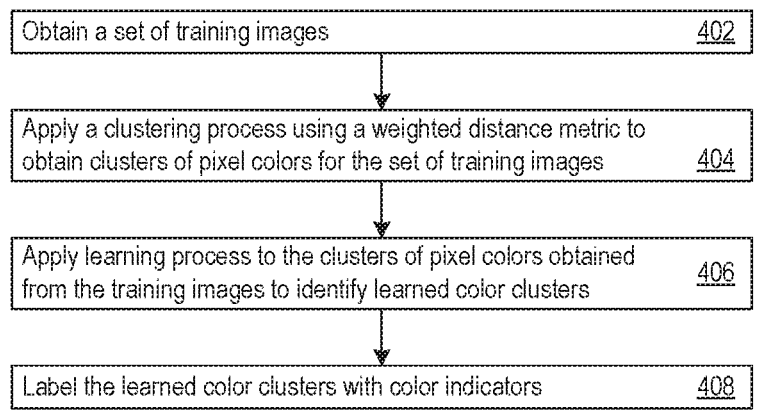
FIG. 4 shows an example of a flow chart of an example method to obtain learned color clusters from a set of training images

FIG. 4 shows a flow chart of an example method 400 to obtain learned color clusters from a set of training images. Execution of the method 400 is described with reference to the color cluster learning engine 106, though any other device, hardware-programming combination, or other suitable computing system may execute any of the steps of the method 400. As examples, the method 400 may be implemented in the form of executable instructions stored on a machine-readable storage medium or in the form of electronic circuitry.

In performing or implementing the method 400, the color cluster learning engine 106 may obtain a set of training images (402). The set of training images may be user-selected, automatically captured, video extracted, or obtained in several other ways. In some examples, the color cluster learning engine 106 may obtain a set of training images comprised of training images of a particular type, object, or other differentiating characteristic. As examples, the set of training images may include vehicle images, architecture designs, television screenshots, images of animals, natural landscapes, or wildlife, and countless other types. The type of images that the set of training images can include is nearly limitless, and the color cluster learning engine 106 may extract color clusters from the set of training images.

Prior to color cluster extraction, the color cluster learning engine 106 may filter or otherwise adjust the set of training images according to any number of criteria. In some examples, the color cluster learning engine 106 may filter images that do not sufficiently depict a particular object type or characteristic. Using vehicle images as an example, the color cluster learning engine 106 may filter a set of vehicle training images to remove any images with a vehicle body occupies less than a threshold percentage, size, or number of pixels in the vehicle image. As another example, the color cluster learning engine 106 may filter a set of vehicle training images to remove any images where the road, windshield, or other non-vehicle body element occupies more than a threshold percentage, size, or portion of the image. Such elements may be identified according to pre-learned or configured pixel colors or through other image analysis techniques. Additionally or alternatively, the color cluster learning engine 106 may generate multiple image patches from individual training images as described above, including from filtered images in some examples. Criteria applied by the color cluster learning engine 106 to filter images from an image training set may overlap with patch generation criteria in its entirety, partially, or not at all.

The color cluster learning engine 106 may apply a clustering process using a weighted distance metric to obtain clusters of pixel colors for the set of training images (404). The clustering processing may be applied to the set of training images (filtered or unfiltered), generated image patches, or combinations of both. The color cluster learning engine 106 may various clustering algorithms or techniques, such as K-means, but do so using a weighted distance metric. As noted above, the weighted distance metric may selectively reduce the contribution of luminance distances in the color distance computations, which may increase color differentiation at high and low ends of the luminance spectrum. Through application of a clustering process, the color cluster learning engine 106 may obtain one or more clusters of pixel colors extracted from individual training images or generated image patches.

From the obtained clusters of pixel colors, the color cluster learning engine may apply a learning process to identify a set of learned color clusters (406). The learning process applied by the color cluster learning engine 106 may be a subsequent or different clustering process that the color cluster learning engine 106 applies. In some examples, the clusters of pixel colors extracted from the set of training images may be represented as cluster centers (e.g., a specific pixel color in a color space for the cluster center). The color cluster learning engine 106 may treat these cluster centers as individual pixel color values and further apply a subsequent clustering process (e.g., K-means) to these extracted cluster centers. The pixel clusters emerging from this subsequent clustering process (or any other learning process) may be identified as learned color clusters 108, and may in effect form a dictionary of clusters learned from the set of training images. The color cluster learning engine 106 may further label the learned color clusters 108 with color indicators (408), e.g., according to user input.

In some examples, the color cluster learning engine 106 may combine steps 406 and 408 of the method 400 by processing the set of training images as whole. In that regard, the color cluster learning engine 106 may merge pixel data of individual training images into a collective pixel data set, and perform a clustering process on the collective pixel data set. By doing so, the color cluster learning engine 106 may extract color clusters from the entire set of training images as a whole, as opposed to processing individual training images. The color clusters emerging from the applied clustering process may be identified by the color cluster learning engine 106 as the learned color clusters 106.

In any of the ways described above, the color cluster learning engine 106 may obtain a set of learned color clusters 108 extracted from a training image set 210. The learned color clusters 108 may be used for color recognition in other images, some examples of which are described next.

Figure 5:
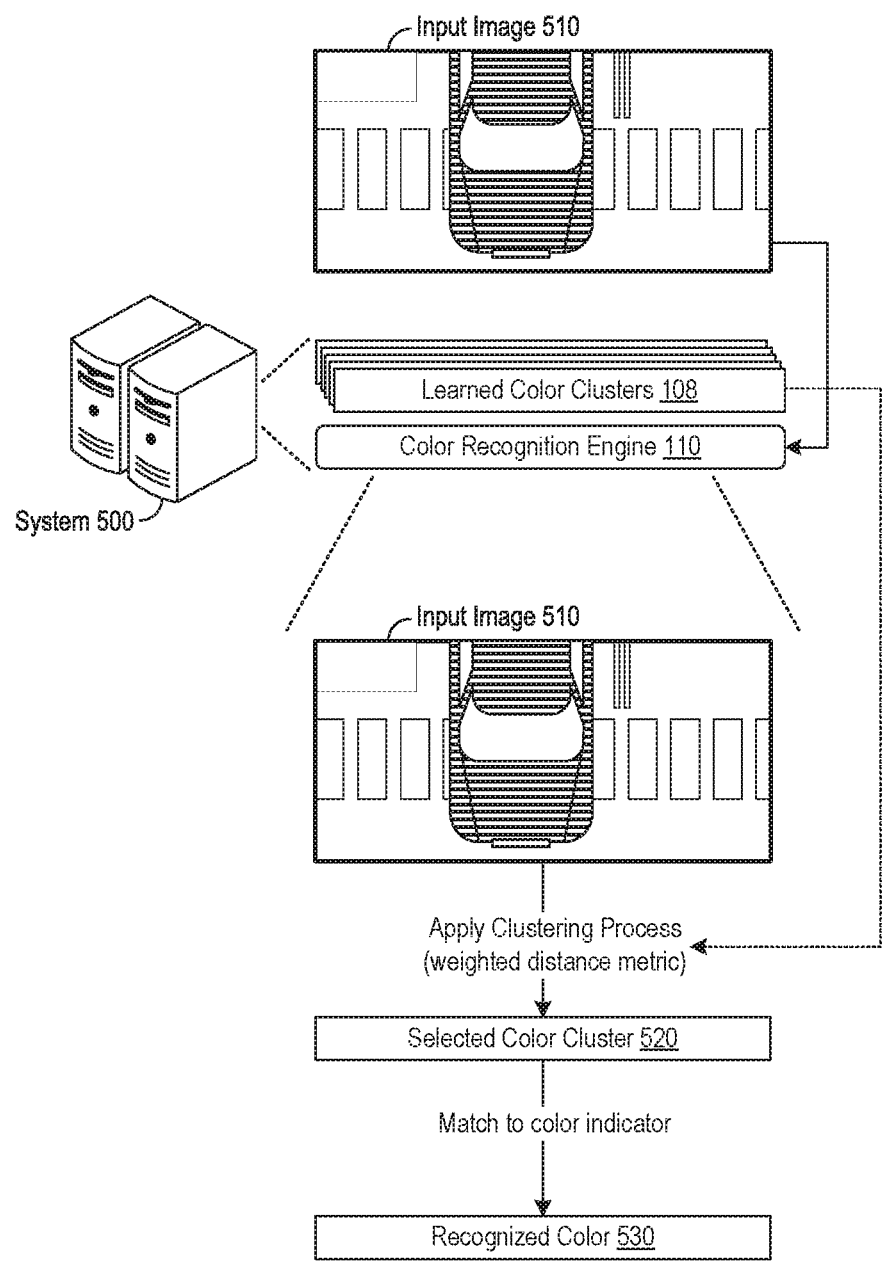
FIG. 5 shows an example of a system that includes a color recognition engine that may perform color recognition on an input image using learned color clusters.

FIG. 5 shows an example of a system 500 that includes a color recognition engine 110 that may perform color recognition on an input image using learned color clusters. In the particular example shown in FIG. 5, the color recognition engine 110 may performs color recognition on an input image 510 using the learned color clusters 108. The learned color clusters 108 may provide a baseline or dictionary set by which the color recognition engine 110 performs color recognition on the input image 510.

In performing color recognition, the color recognition engine 110 may apply a clustering process on the input image 510 to extract one or more color clusters from the input image 510. The color recognition engine 110 may use the learned color clusters 108 as references for cluster initializations in starting the clustering process, though the color recognition engine 110 may additionally or alternatively start the clustering process with randomly initialized clusters. With initialized clusters determined both from the learned color clusters 108 (which may be referred to as initial learned clusters) and randomly selected clusters (which may be referred to as initial random clusters), the color recognition engine 110 may iteratively assign pixels of the input image 510 to clusters based on color distances, recalculate cluster centers, and perform cluster removal until the clustering process converges or ends. In doing so, the clustering process applied by the color recognition engine 110 may use a weighted distance metric, for example according to any of the weighted distance metric features discussed above. Various features of clustering processes that the color recognition engine 110 may apply are further discussed below with regards to FIG. 7.

Through application of the clustering process, the color recognition engine 110 may obtain a set of extracted color clusters from the input image 510. The color recognition engine 110 may select, from the set, a particular color cluster that includes the greatest number of pixels of the input image 510 or occupies a greatest percentage of the input image 510. In FIG. 5, the color recognition engine 110 obtains the selected color cluster 520.

The color recognition engine 110 may compare the selected color cluster 520 to the learned color clusters 108 to identify a learned color present in the input image 510. For instance, the color recognition engine 110 may match the selected color cluster 520 to one of the learned color clusters 108 according to a lowest color distance (e.g., using the weighted distance metric) and thus identify a matching learned color cluster with the shortest color distance to the selected color cluster 520. Then, the color recognition engine 110 may determine the color indicator for the matching learned color cluster (e.g., "red", "green", "silver", or other color indicators), which the color recognition engine 110 may output as the recognized color 530 for the input image 510.

In some examples, the color recognition engine 110 may deem the selected color cluster 520 insufficiently close to any of the learned color clusters 108. For example, the color recognition engine 110 may determine that the color distance between the selected color cluster 520 and the learned color clusters 108 each exceed maximum distance threshold. In such cases, the color recognition engine 110 may determine that none of the learned color clusters 108 match the selected color cluster 520 and output an unrecognized color message, the pixel color of the selected color cluster (e.g., the pixel color of the cluster center), or both.

As described above, the color recognition engine 110 may perform color recognition on an input image 510 using learned color clusters 108. The learned color clusters 108 may be used to support cluster initializations in a cluster process as well as to match color indicators for color clusters extracted from the input image 510.

Figure 6:
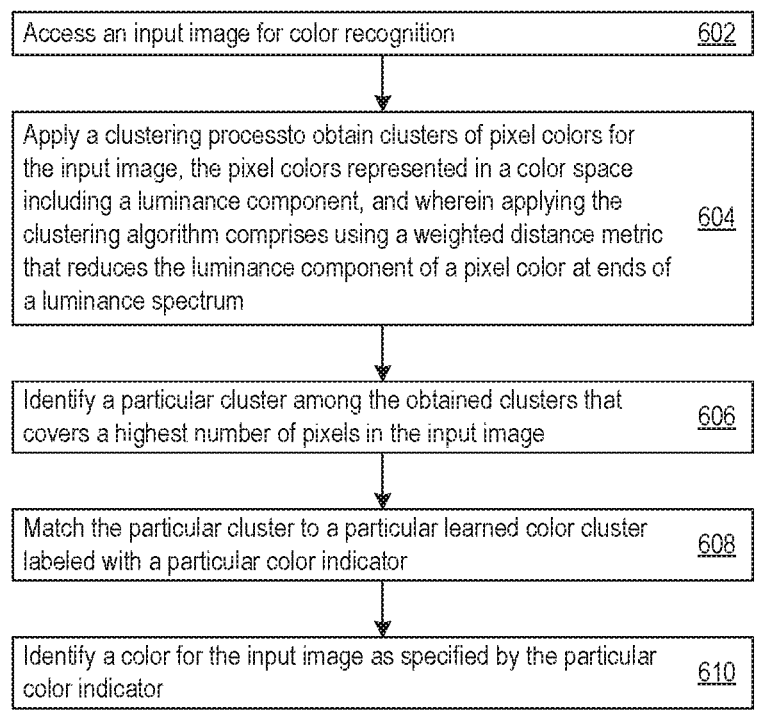
FIG. 6 shows a flow chart of an example method to identify colors from an input image using learned color clusters

FIG. 6 shows a flow chart of an example method 600 to identify colors from an input image using learned color clusters. Execution of the method 600 is described with reference to the color recognition engine 110, though any other device, hardware-programming combination, or other suitable computing system may execute any of the steps of the method 600. As examples, the method 600 may be implemented in the form of executable instructions stored on a machine-readable storage medium or in the form of electronic circuitry.

In implementing or performing the method 600, the color recognition engine 110 may access an input image for color recognition (602). The color recognition engine 110 may further apply a clustering process to obtain clusters of pixel colors for the input image, the pixel colors represented in a color space including a luminance component (604). Application of the clustering process may include using a weighted distance metric that reduces the luminance component of a pixel color at ends of a luminance spectrum. Then, the color recognition engine 110 may identify a particular cluster among the obtained clusters that covers a highest number of pixels in the input image (606), match the particular cluster to a particular learned color cluster labeled with a particular color indicator (608), and identify a color for the input image as specified by the particular color indicator (610).

Figure 7:
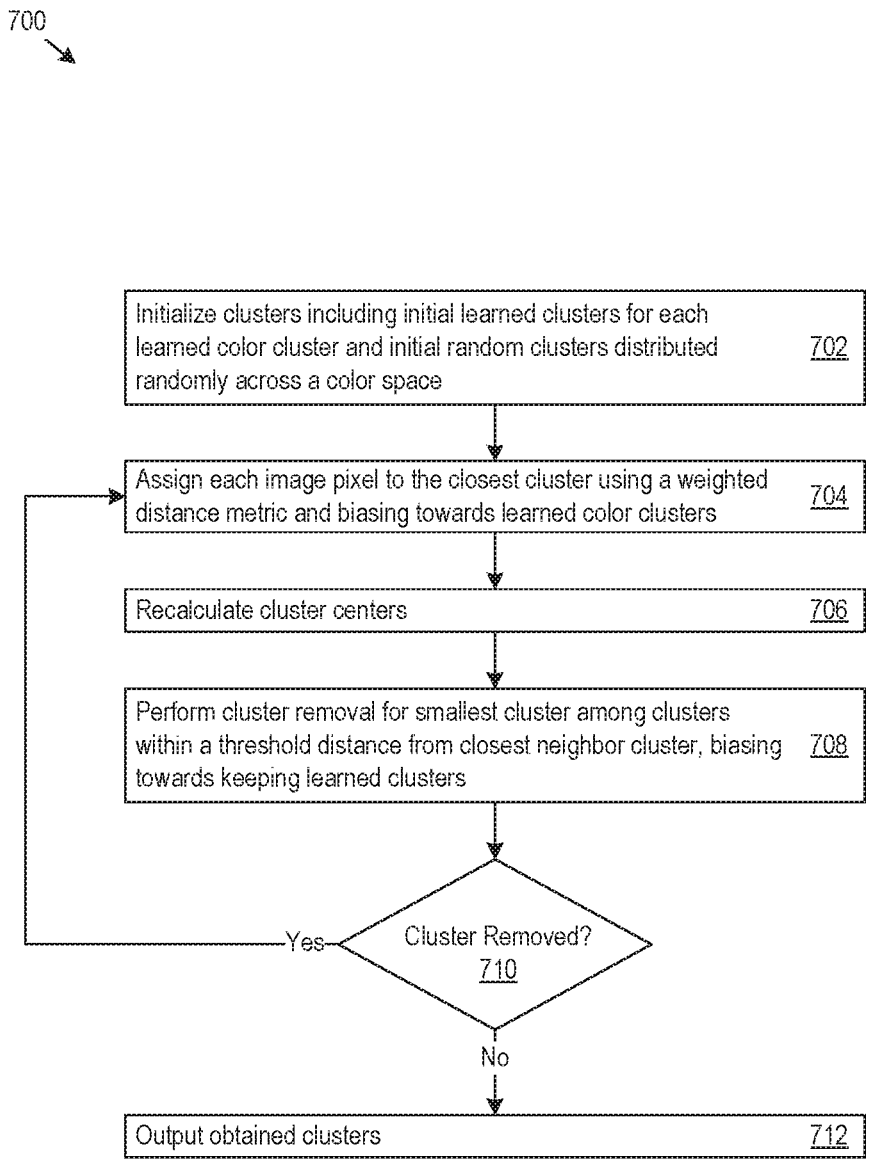
FIG. 7 shows a flow chart of an example method to obtain color clusters from an input image using a weighted distance metric

FIG. 7 shows a flow chart of an example method 700 to obtain color clusters from an input image using a weighted distance metric. The method 700 may provide an example clustering process to extract color clusters from an image. Execution of the method 700 is described with reference to the color recognition engine 110, though any other device, hardware-programming combination, or other suitable computing system may execute any of the steps of the method 700. As examples, the method 700 may be implemented in the form of executable instructions stored on a machine-readable storage medium or in the form of electronic circuitry.

In implementing or performing the method 700, the color recognition engine 110 may access an image and initialize clusters for a clustering process. Initialization of clusters may refer to determining an initial set of cluster centers used in a first iteration of a clustering process, and the color recognition engine 110 may initialize using the learned color clusters 108 (e.g., as determined by the color cluster learning engine 106). In particular, the color recognition engine 110 may initialize clusters that include initial learned clusters and initial random clusters (702). The initial learned clusters may include an initial cluster center for each of the learned color clusters 108 and the initial random clusters may include initial cluster centers randomly distributed or selected across a color space.

The color recognition engine 110 may iteratively assign pixels to clusters and recalculate cluster centers. As such, the color recognition engine 110 may assign each image pixel to a closest cluster, e.g., as determined using a weighted distance metric and biasing towards learned color cluster (704). In the first iteration, the color recognition engine 110 may assign image pixels to the initial learned clusters and the initial random clusters. In subsequent iterations, the color recognition engine 110 may assign image pixels to recalculated cluster centers. The closest cluster may be determined according to color distance and such distance computations may be performed using a weighted distance metric (and in any of the ways described herein).

In some implementations, the color recognition engine 110 biases pixel assignments towards learned color clusters. Such a bias may be accomplished by biasing assignment of image pixels towards initial learned clusters or recalculated clusters that were originally initialized as initial learned clusters (also referred to as recalculated learned clusters). The color recognition engine 110 may effectuate such a biasing in various ways. In some examples, the color recognition engine 110 may reduce computed color distances between image pixels and initial learned clusters and recalculated learned clusters while keeping computing color distances between the image pixels and initial random clusters and subsequent recalculated random clusters the same. During pixel assignment, such a biasing may trend image pixels towards initial and recalculated learned clusters. As example numbers, the color recognition engine 110 may reduce computed color distances to initial and recalculated learned clusters by 80%, 75%, 50%, or any other configurable biasing value while keeping computed color distances to initial and recalculated random clusters at a full 100%.

Thus, the color recognition engine 110 may assign a particular pixel of the input image to a cluster as part of processing the input image by calculating distances between the particular pixel and cluster centers of randomly initialized clusters (or subsequent clusters recalculated from the initial random clusters) and calculating distances between the particular pixel and cluster centers of the learned color clusters (or subsequent clusters recalculated from the learned color clusters). The color recognition engine 110 may then determine biased distances by reducing the calculated distances to the cluster centers of the learned color clusters by a bias value and assign the particular pixel to a cluster with a least calculated distance among the calculated distances to the cluster centers of the randomly initialized clusters and the biased distances calculated for the learned color clusters. In such a way, the color recognition engine 110 may perform image pixel assignment for an image and do so biasing towards learned color clusters.

Upon assigning each image pixel of an image to a respective cluster, the color recognition engine 110 may recalculate cluster centers (706). This may be done by, for example, determining a mean color value of pixels assigned to a cluster. During cluster center recalculation, the color recognition engine 110 may differentiate between learned and random clusters. For initial and recalculated random clusters, the color recognition engine 110 may recalculate the cluster center to the mean color value of assigned image pixels. For initial and recalculated learned clusters, the color recognition engine 110 may recalculate the cluster center to the mean color value of the assigned image pixels when (e.g., responsive to a determination that) the mean color value is within a threshold distance from a learned color cluster 108 (e.g., within a threshold distance from the initial learned cluster). Responsive to a determination that the mean color value is not within the threshold distance, the color recognition engine 110 may adjust the cluster center to a color value that is both (i) nearest to the mean color value and (ii) within the threshold distance. Thus, the color recognition engine 110 may ensure that recalculated color clusters derived from initial learned clusters do not deviate beyond a threshold distance, which may bias clustering of image pixels towards learned color clusters.

The color recognition engine 110 may perform cluster removal at various points in a clustering processing. For instance, the color recognition engine 110 may perform cluster removal periodically after a number of iterations of pixel assignment (e.g., 704) and cluster recalculation (e.g., 706) or at any other configurable times. The color recognition engine 110 may selectively remove clusters that meet cluster removal criteria, for example by performing cluster removal with respect to a smallest cluster among clusters within a threshold distance from closest neighbor cluster, biasing towards keeping learned clusters (708).

To illustrate, the color recognition engine 110 may identify, at a current point in the clustering process, each cluster that is within a threshold distance from its closest neighboring cluster. A neighboring cluster may refer to any other cluster at the current point in the clustering process and a closest cluster may be determined according to a lowest or shortest color distance between clusters. In that regard, the color recognition engine 110 may identify a closest neighbor using color distance computations between cluster centers, e.g., using a weighted distance metric. The color recognition engine 110 may select the smallest cluster among the clusters with neighboring clusters that meet the threshold distance requirement, e.g., the cluster with the least number of assigned image pixels.

With respect to the selected (smallest) cluster, the color recognition engine 110 may perform cluster removal and do so biasing towards keeping initial or recalculated learned clusters. Responsive to a determination that the selected cluster is an initial or recalculated learned cluster and that the closest neighboring cluster of the selected cluster is an initial or recalculated random cluster, the color recognition engine 110 may remove the closet neighboring cluster (which, in this scenario, is a random cluster) instead of the selected cluster (which, in this scenario is a learned cluster). As such, the color recognition engine 110 may bias towards removal of random clusters instead of learned clusters in some scenarios. In other scenarios when the selected cluster itself is random cluster (initial or recalculated) or the closest neighboring cluster is also a learned cluster (initial or recalculated), the color recognition engine 110 may determine to remove the selected cluster.

The color recognition engine 110 may iteratively perform through the pixel assignment, cluster recalculation, and cluster removal steps (though, perhaps at differing frequencies) until convergence. When a cluster has been successfully removed via performed cluster removal (710), the color recognition engine 110 may continue to Responsive to a determination that no cluster was removed during a cluster removal process (710), the color recognition engine 110 may determine that a cluster process has converged. In that regard, the color recognition may determine that no cluster at the current point of the clustering process satisfies cluster removal criteria. Responsive to such a convergence determination, the color recognition engine 110 may output the obtained clusters (e.g., cluster centers) and assigned image pixels (712).

Figure 8:
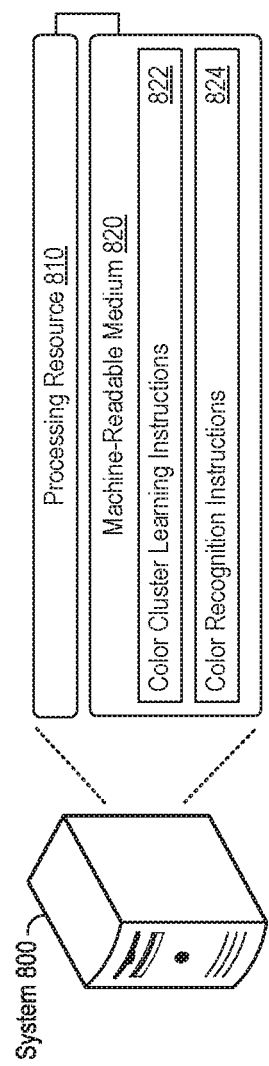
FIG. 8 shows an example of a system that supports color recognition through learned color clusters.

FIG. 8 shows an example of a system 800 that supports color recognition through learned color clusters. The system 800 may include a processing resource 810, which may take the form of a single or multiple processors. The processor(s) may include a central processing unit (CPU), microprocessor, or any hardware device suitable for executing instructions stored on a machine-readable medium, such as the machine-readable medium 820 shown in FIG. 8. The machine-readable medium 820 may be any non-transitory electronic, magnetic, optical, or other physical storage device that stores executable instructions, such as the color cluster learning instructions 822 and color recognition instructions 824 shown in FIG. 8. As such, the machine-readable medium 820 may be, for example, Random Access Memory (RAM) such as dynamic RAM (DRAM), flash memory, memristor memory, spin-transfer torque memory, an Electrically-Erasable Programmable Read-Only Memory (EEPROM), a storage drive, an optical disk, and the like.

The system 800 may execute instructions stored on the machine-readable medium 820 through the processing resource 810. Executing the instructions may cause the system 800 to perform any of the features described herein, including according to any features of the color cluster learning engine 106, the color recognition engine 110, or combinations thereof.

For example, execution of the color cluster learning instructions 822 by the processing resource 810 may cause the system 800 to, for example, obtain a training set of vehicle images; process the training set of vehicle images to obtain clusters of pixel colors for the training set of vehicle images, the pixel colors represented in a color space including a luminance component; identify a set of learned color clusters from the training set of vehicle images; and correlate the learned color clusters to vehicle colors (e.g., via labeling of color indicators). Multiple learned color clusters may be mapped to the particular vehicle color in some examples. Execution of the color recognition instructions 824 by the processing resource 810 may cause the system 800 to, for example, receive an input vehicle image to extract a vehicle color from; process the input vehicle image to obtain a particular cluster of pixel colors that covers the highest number of pixels in the input vehicle image, the pixel colors represented in the color space with the luminance component; map the particular cluster to a particular learned color cluster associated with a particular vehicle color; and identify a vehicle color of the input vehicle image as the particular vehicle color.

In some examples, the color cluster learning instructions 822 are executable by the processing resource 810 to process the training set of vehicle images to obtain clusters of pixel colors by applying a clustering process using a weighted distance metric that reduces the luminance component of a pixel color at ends of a luminance spectrum. In a similar manner, the color recognition instructions 824 may be executable by the processing resource 810 to process the input vehicle image also using the weighted distance metric to obtain the clusters of pixel colors from the input vehicle image. The weighted distance metric may weights the luminance component of a pixel color with a first weight value at the ends of the luminance spectrum and a second weight value at a midpoint of the luminance spectrum, and in such cases the second weight value may be greater than the first weight value. Any number of weight curves may be used, e.g., in any of the ways described herein.

In some examples, the multiple learned color clusters may be mapped or associated with the same particular vehicle color. In such examples, the multiple learned color clusters may include a first learned color cluster corresponding to the particular vehicle color at a first illumination level (e.g., a red vehicle color in bright lighting conditions) and a second learned color cluster corresponding to the particular vehicle color at a second illumination level different from the first illumination level (e.g., a red vehicle color in dark lighting conditions). While some examples have been described in FIG. 8 with respect to color cluster learning and color recognitions specifically for vehicle images, any of the features described herein may be consistently applied for any other image type or category.

The systems, methods, engines, devices, and logic described above, including the color cluster learning engine 106 and the color recognition engine 110, may be implemented in many different ways in many different combinations of hardware, logic, circuitry, and executable instructions stored on a machine-readable medium. For example, the color cluster learning engine 106 or the color recognition engine 110 may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine readable instructions stored on the medium, which when executed in an endpoint, computer system, or other device, cause the device to perform operations according to any of the description above, including according to any features of the color cluster learning engine 106 and the color recognition engine 110.

The processing capability of the systems, devices, and engines described herein, including the color cluster learning engine 106 and the color recognition engine 110, may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library (e.g., a shared library).

While various examples have been described above, many more implementations are possible.

The invention claimed is:

1. A system comprising:
a processor; and
a non-transitory computer readable medium storing machine readable instructions, wherein the processor executes the machine readable instructions to:
obtain a set of training images;
process the training images to obtain clusters of pixel colors for the training images;
identify learned color clusters from the clusters of pixel colors obtained from the training images, wherein the machine readable instructions are executable further to:
generate an image patch depicting extraneous content to be extracted from the set of training images, and wherein the generated image patch is processed utilizing a cluster center and a weighted distance metric for the generated image patch;
obtain a representative color cluster utilizing the generated image patch; and
utilize the representative color cluster in identifying the learned color clusters;
label the learned color clusters with color indicators;
receive an input image for color identification;
extract a first color cluster in the input image using the learned color clusters and randomly initialized color clusters;
iteratively assign pixels in the input image to the first color cluster from the input image;
remove a second color cluster from the input image that meets a cluster removal criteria, wherein the cluster removal criteria utilizes a biasing towards the learned color clusters;
process the input image to obtain a particular cluster of pixel colors that covers the highest number of pixels in the input image;
match the particular cluster to a particular learned color cluster labeled with a particular color indicator; and
identify a color of the input image as specified by the particular color indicator.

2. The system of claim 1, wherein the training images are represented in a color space including a luminance component; and wherein the machine readable instructions are further configured to:
obtain clusters of pixel colors by applying a clustering process using a weighted distance metric that reduces a weight of the luminance component of a pixel color at ends of a luminance spectrum.

3. The system of claim 2, wherein the machine readable instructions are further configured to:
process the input image also using the weighted distance metric that reduces the weight of the luminance component to obtain the clusters of pixel colors from the input image.

4. The system of claim 1, wherein the machine readable instructions are further configured to:
represent each learned color cluster as the pixel color of a cluster center of the learned color cluster; and
match the particular cluster obtained from the input image to the particular learned color cluster by determining that a center of the particular cluster has a lesser distance to the cluster center of the particular learned color cluster than to other cluster centers of other learned color clusters.

5. The system of claim 4, wherein the training images and the input images are represented in a color space including a luminance component, and wherein the machine readable instructions are further configured to:

compare distances between cluster centers using a weighted distance metric that reduces the luminance component of a pixel color at ends of a luminance spectrum.

6. The system of claim 1, wherein the machine readable instructions are further configured to:
calculate distances between the particular pixel and cluster centers of randomly initialized clusters;
calculate distances between the particular pixel and cluster centers of the learned color clusters;
determine biased distances by reducing the calculated distances to the cluster centers of the learned color clusters by a bias value; and
assign a particular pixel of the input image to a cluster with a least calculated distance among the calculated distances to the cluster centers of the randomly initialized clusters and the biased distances.

7. The system of claim 1, wherein the machine readable instructions are further configured to:
label multiple learned color clusters with the same color indicator.

8. A method comprising:
accessing an input image for color recognition;
applying a clustering process to obtain clusters of pixel colors for the input image, the pixel colors represented in a color space including a luminance component, and wherein applying the clustering process comprises using a weighted distance metric that reduces the luminance component of a pixel color at ends of a luminance spectrum;
generating an image patch depicting extraneous content to be extracted from an obtained set of training images, and wherein the generated image patch is processed utilizing a cluster center and a weighted distance metric for the generated image patch;
identifying learned color clusters from the clusters of pixel colors obtained from the training images, further including:
obtaining a representative color cluster utilizing the generated image patch; and
utilizing the representative color cluster in identifying the learned color clusters;
extracting a first color cluster from the input image using the learned color clusters and randomly initialized color clusters;
iteratively assigning pixels from the input image to the first color cluster from the input image;
removing a second color cluster from the input image that meets a cluster removal criteria, wherein the cluster removal criteria utilizes a biasing towards the learned color clusters;
identifying a particular cluster among the obtained clusters that covers a highest number of pixels in the input image;
matching the particular cluster to a particular learned color cluster labeled with a particular color indicator; and
identifying a color for the input image as specified by the particular color indicator.

9. The method of claim 8, wherein matching comprises determining that the particular cluster has a lesser distance in the color space to a cluster center of the particular learned color cluster than to other cluster centers of other learned color clusters.

10. The method of claim 9, further comprising determining distances between the particular color clusters and cluster centers of learned color clusters using the weighted distance metric that reduces the luminance component of a pixel color at ends of a luminance spectrum.

11. The method of claim 10, wherein:
the weighted distance metric that reduces the luminance component weights the luminance component of a pixel color with a first weight value at the ends of the luminance spectrum and a second weight value at a midpoint of the luminance spectrum; and
the second weight value is greater than the first weight value.

12. The method of claim 11, wherein the weighted distance metric that reduces the luminance component further weights the luminance component linearly between the ends of the luminance spectrum and the midpoint of the luminance spectrum.

13. The method of claim 11, wherein weighted distance metric that reduces the luminance component further weights the luminance component between the ends of the luminance spectrum and the midpoint of the luminance spectrum according to an entropy curve.

14. The method of claim 8, further comprising, prior to accessing the input image:
processing the obtained set of training images to obtain clusters of pixel colors for the obtained set of training images, the pixel colors represented in the color space including a luminance component;
identifying a set of learned color clusters that includes the particular learned color cluster from the obtained set of training images; and
labeling the learned color clusters with color indicators including labeling the particular learned color cluster with the particular color indicator.

15. A non-transitory machine-readable medium comprising instructions executable by a processing resource to:
obtain a training set of vehicle images;
process the training set of vehicle images to obtain clusters of pixel colors for the training set of vehicle images, the pixel colors represented in a color space including a luminance component;
identify a set of learned color clusters from the training set of vehicle images, wherein the instructions are further executable to:
generate an image patch depicting extraneous content to be extracted from the training set of vehicle images, and wherein the generated image patch is processed utilizing a cluster center and a weighted distance metric for the generated image patch;
obtain a representative color cluster utilizing the generated image patch; and
utilize the representative color cluster in identifying the set of learned color clusters;
correlate the learned color clusters to vehicle colors;
receive an input vehicle image to extract a vehicle color from;
extract a first color cluster from the input vehicle image using the learned color clusters and randomly initialized color clusters;
iteratively assign pixels from the input vehicle image to the first color cluster from the input image;
remove a second color cluster from the input image that meets a cluster removal criteria, wherein the cluster removal criteria utilizes a biasing towards the learned color clusters;

process the input vehicle image to obtain a particular cluster of pixel colors that covers the highest number of pixels in the input vehicle image, the pixel colors represented in the color space with the luminance component;

map the particular cluster to a particular learned color cluster associated with a particular vehicle color; and identify a vehicle color of the input vehicle image as the particular vehicle color.

16. The non-transitory machine-readable medium of claim 15, wherein the instructions are executable by the processing resource to process the training set of vehicle images to obtain clusters of pixel colors by applying a clustering process using a weighted distance metric that reduces the luminance component of a pixel color at ends of a luminance spectrum.

17. The non-transitory machine-readable medium of claim 16, wherein the instructions are executable by the processing resource to process the input vehicle image also using the weighted distance metric that reduces the luminance component to obtain the clusters of pixel colors from the input vehicle image.

18. The non-transitory machine-readable medium of claim 16, wherein:

the weighted distance metric that reduces the luminance component weights the luminance component of a pixel color with a first weight value at the ends of the luminance spectrum and a second weight value at a midpoint of the luminance spectrum; and the second weight value is greater than the first weight value.

19. The non-transitory machine-readable medium of claim 15, wherein the instructions are executable by the processing resource to map multiple learned color clusters to the particular vehicle color.

20. The non-transitory machine-readable medium of claim 19, wherein the multiple learned color clusters associated with the particular vehicle color include:

a first learned color cluster corresponding to the particular vehicle color at a first illumination level; and a second learned color cluster corresponding to the particular vehicle color at a second illumination level different from the first illumination level.

* * * * *